United States Patent [19]

Adler

[11] 4,255,811
[45] Mar. 10, 1981

[54] KEY CONTROLLED BLOCK CIPHER CRYPTOGRAPHIC SYSTEM

[75] Inventor: Roy L. Adler, Ossining, N.Y.

[73] Assignee: International Business Machines Corporation, Armonk, N.Y.

[21] Appl. No.: 561,760

[22] Filed: Mar. 25, 1975

[51] Int. Cl.³ .............................................. H04L 9/02
[52] U.S. Cl. ........................................................ 375/2
[58] Field of Search ................... 178/22; 235/165, 168; 340/172.5; 375/2

[56] References Cited

U.S. PATENT DOCUMENTS 3,798,360  3/1974  Feistel .................................... 178/22

*Primary Examiner*—Howard A. Birmiel
*Attorney, Agent, or Firm*—Roy R. Schlemmer, Jr.

[57] ABSTRACT

A cryptographic system for encrypting a block of binary data under the control of a key consisting of a set of binary symbols. The cryptographic system may be utilized within a data processing environment to ensure complete privacy of data and information that is stored or processed within a computing system. All authorized subscribers who are permitted access to data within the network are assigned a unique key consisting of a combination of binary symbols. The central processing unit within the computing network contains a complete listing of all distributed authorized subscriber keys. All communications transmitted from terminal input are encrypted into a block cipher by use of the cryptographic system operating under the control of the subscriber key which is inputed to the terminal device. At the receiving station or central processing unit, an identical subscriber key which is obtained from internal tables stored within the computing system is used to decipher all received ciphered communications.

16 Claims, 6 Drawing Figures

KEY CONTROLLED BLOCK CIPHER CRYPTOGRAPHIC SYSTEM

The cryptographic system of the present invention would be utilized in data communication and transmission systems in substantially the same way. The transmitting station performs the encryption of the data utilizing a unique subscriber key whereupon the data is transmitted in the encrypted form. At the receiving station, the encrypted data is passed through a decrypt unit supplied with the same unique key and clear text is available at the output of the decrypt section at the receiver.

The cryptographic system produces a product cipher and blocks of clear message which is a combination of a plurality of modulo-2 additions, addition-with-carry, and shifting operations which occur under control of the key. The modulo-2 and additions-with-carry produce the transformations which are a function of the binary values that appear in the subscriber key and also in the data block in its current form currently being presented for encryption or decryption.

The encryption/decryption hardware is substantially identical with only minor modifications being necessary to adapt it for either encryption or decryption.

PRIOR ART

Reference is hereby made to U.S. Pat. No. 3,798,359 of H. Feistel entitled "Block Cipher Cryptographic System", which similarly relates to key controlled block cipher cryptographic systems which utilizes key control of a number of linear transformations and also of a non-linear substitution step. Reference is also made to U.S. Pat. No. 3,796,830 of J. L. Smith entitled "Recirculating Block Cipher Cryptographic System", U.S. Pat. No. 3,798,360 of H. Feistel entitled "Step Code Ciphering System", and U.S. Pat. No. 3,798,605 of H. Feistel entitled "Centralized Verification System", all of which illustrate the system usage of a key controlled block cipher cryptographic system as utilized generally in a computer environment for effecting the security of stored or transmitted data within such systems as from remote terminals or the like.

The use of data enciphering and deciphering in transmission systems is thought to be generally well known in the art and specific references will not be given. It will however be noted that the United States Patent Office Classification System Class 178, Subclass 22 is largely devoted to such systems for effecting secret transmission of data.

BACKGROUND OF THE INVENTION

With the growing use of remote-access computer networks which provide a large number of subscribers access to "Data Banks" for receiving, storing, processing and furnishing information of a confidential nature, the question of data security has come to be of increasing concern. Generally, present day computing centers have elaborate procedures for maintaining physical security at the location where the central processor and data storage facilities are located. For example, some procedures used are the restriction of personnel within the computing center, utilization of mechanical keys for activating computer systems and associated terminal devices, and other techniques of this type. These security procedures while providing a measure of safety in keeping out unauthorized individuals from the computing center itself, are not effective with respect to large remote access computer networks which have many terminals located at far distant sites or systems which have a capability of accepting terminal inputs via telecommunication lines.

Some digital techniques have been implemented in computing systems for the purpose of maintaining privacy of data. One such approach is to use a feature generally known as memory protection. This type of data security approach associates with various segments of the storage within the central processor a unique binary key. Then, internal to the processor, there are various protection circuits that check for a match of the binary key executable instructions and those sections of storage which are to be accessed. While this type of protection system provides a certain measure of privacy with respect to accidental destruction of stored information, it would not prove very effective in protecting information within the computing system from a sophisticated cryptanalyst who has complete knowledge of the computing system. In the field of communication, cryptography has long been recognized as a means of achieving certain aspects of security. Various systems have been developed in the prior art for encrypting messages for maintaining secrecy of communications. One well known technique for generating ciphers from clear text messages, is the use of substitution systems. Technically, in such a system, letters or symbols of the clear text are substituted by some other symbol in accordance with a predetermined "Key". The resulting substituted message, comprises a cipher which is secret and hopefully cannot be understood without knowledge of the appropriate key. A particular advantage of substitution in accordance with a prescribed key is that the deciphering operation is easily implemented by a reverse application of the key. A common implementation of substitution techniques may be found in ciphering wheel devices. For example, those disclosed in U.S. Pat. Nos. 2,964,856 and 2,984,700 filed Mar. 10, 1941 and Sept. 22, 1944, respectively.

Further teachings on the design of principles of more advanced substitution techniques may be found in "Communication Theory of Secrecy Systems" by C. E. Shannon, Bell System Technical Journal, Vol. 28, pages 656–715, October 1949. Shannon, in his paper, presents further developments in the art of cryptography by introducing the product cipher. That is, the successive application of two or more distinctly different kinds of message symbol transformations. One example of a product cipher consists of a symbol substitution (nonlinear transformation) followed by a symbol transposition (linear transformation).

Another well known technique for enciphering a clear text message communication, is the use of a ciphered stream bit sequence which is used to form a modulo sum with the symbols of the clear text. The ciphered output message stream is unintelligible without having knowledge of the stream bit generator sequence, which is sometimes referred to as a "key". Examples of such key generators may be found in U.S. Pat. Nos. 3,250,855 and 3,364,308, filed May 23, 1962 and Jan. 23, 1963, respectively.

Various ciphering systems have been developed in the prior art for rearranging communication data in some ordered way to provide secrecy. For example, U.S. Pat. No. 3,522,374 filed June 12, 1967 teaches the processing of a clear text message with a key material generator that controls the number of cycles for ciphering and deciphering. Related to this patent, is U.S. Pat. No. 3,506,783, filed June 12, 1967 which discloses the means for generating the key material which gives a very long pseudo random sequence.

Another approach which has been utilized in the prior art for establishing secret communications, is the coding of the electrical signals themselves which are transmitted on the channel. These types of techniques are more effective in preventing jamming or unauthorized tapping of a communications channel than in preventing a cryptanalyst from understanding a cipher message. Examples of these types of systems may be found in U.S. Pat. Nos. 3,411,089, filed June 28, 1962 and 3,188,390, filed June 8, 1965.

While available prior art systems, notably U.S. Pat. No. 3,798,359, are believed to provide extremely secure cryptographic systems which are not thought to be susceptible of "cracking" by any currently known cryptanalysis methods, it is nevertheless desirable to produce systems which offer approximately the same level of invulnerability to attack at a lower cost of either the required hardware or the time for the encryption method to be completed. In the above mentioned patent, a substantial number of address increments must occur as well as memory accesses in order to perform the various nonlinear transformation or substitution steps. There must also be a substantial amount of capital investment in the actual storage circuitry for said "substitution" binary bit patterns. It is apparent that any cryptography system providing an acceptable level of invulnerability to cracking constructed of less costly hardware would have certain advantages.

SUMMARY AND OBJECTS OF THE INVENTION

It has been found that a highly secure cryptography method is possible utilizing a series of data manipulations readily realizable from standard binary computer circuitry. These operations include modulo-2 addition, addition-with-carry, circular shifting or rotation of a partially encoded or decoded block of data, together with a continuous regeneration of a unique encryption key originally supplied to the system prior to encoding or decoding. By changing the addition with carry to subtraction with carry, reversing the direction of rotation and the direction of key generation the same hardware may be utilized for both encoding and decoding.

It is accordingly a primary object of the present invention to provide a cryptographic method and apparatus capable of maintaining a high degree of secrecy during the transmission or storage of binary data.

It is a further object of the invention to provide such a cryptographic method and apparatus particularly suitable for use in information handling systems such as an electronic digital computer.

It is a still further object of the invention to provide such a cryptographic method and apparatus which produces enciphered binary data blocks into a cipher text that is not susceptible to breaking by known cryptanalysis methods.

It is another object of the invention to provide such a method and apparatus that operates on a block of data by developing a product cipher dependent upon a unique key which is known only to authorized users and to the system.

It is a still further object of the present invention to provide such a method and apparatus capable of enciphering a clear text message by means of a product cipher of successive blocks of said message, each product cipher comprising a plurality of linear and affine transformations which are a function of a unique subscriber key configuration, wherein each transformation utilizes a key input which is itself a subset or function of said key and further including a unique nonlinear transformation comprising addition-with-carry of a partially enciphered or deciphered block of data under control of said subscriber key.

It is a further object of the present invention to provide such a cryptographic system capable of maintaining privacy between any transmitting and receiving station in a communications network or between a plurality of terminals and a central processor including data banks of a computer system.

It is yet another object of the invention to provide such a method and apparatus which may be utilized for both encryption and decryption with very slight modification.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

The objects of the present invention are accomplished in general by a method and apparatus for enciphering and deciphering binary data which comprises entering a predetermined block of data into the system together with a unique binary key to be utilized in said enciphering and deciphering operations. The binary key is utilized to subsequently generate a succession of keys to be combined with said originally entered block of data in a plurality of nonlinear and affine transformations. In the preferred embodiment of the invention, the original cipher block (either encrypted or clear) undergoes a series of such transformations including one nonlinear and at least three affine transformations, said series making up an encryption round. A predetermined number N of such rounds is performed and an additional nonlinear transformation is performed on the block prior to outputting in either the enciphered or clear form. Whether this latter transformation is performed prior to or after the rounds depends upon whether an enciphering or deciphering operation is being performed.

In a preferred embodiment of the invention, a round includes a first exclusive-or operation followed by a permutation of the bit positions, a circular shifting operation the inverse of the previous permutation operation a second exclusive-or operation and an addition-with-carry. The addition-with-carry or its inverse subtraction-with-borrow may be the first or last step of a round depending on whether an encryption or decryption operation is being performed. Each of these transformations is performed utilizing successively generated key material produced by a key processor or generator which produces said series of keys from the key material originally presented to the system. As will be apparent from the subsequent description, an additional addition-with-carry (subtraction-with-borrow) transformation is performed either prior to the rounds during encryption or after the rounds during decryption. This is to maintain mathematical symmetry of the operation which permits the operation to be performed in either a frontwards or a backwards manner, depending upon whether one is performing encryption or decryption.

Figure 1:
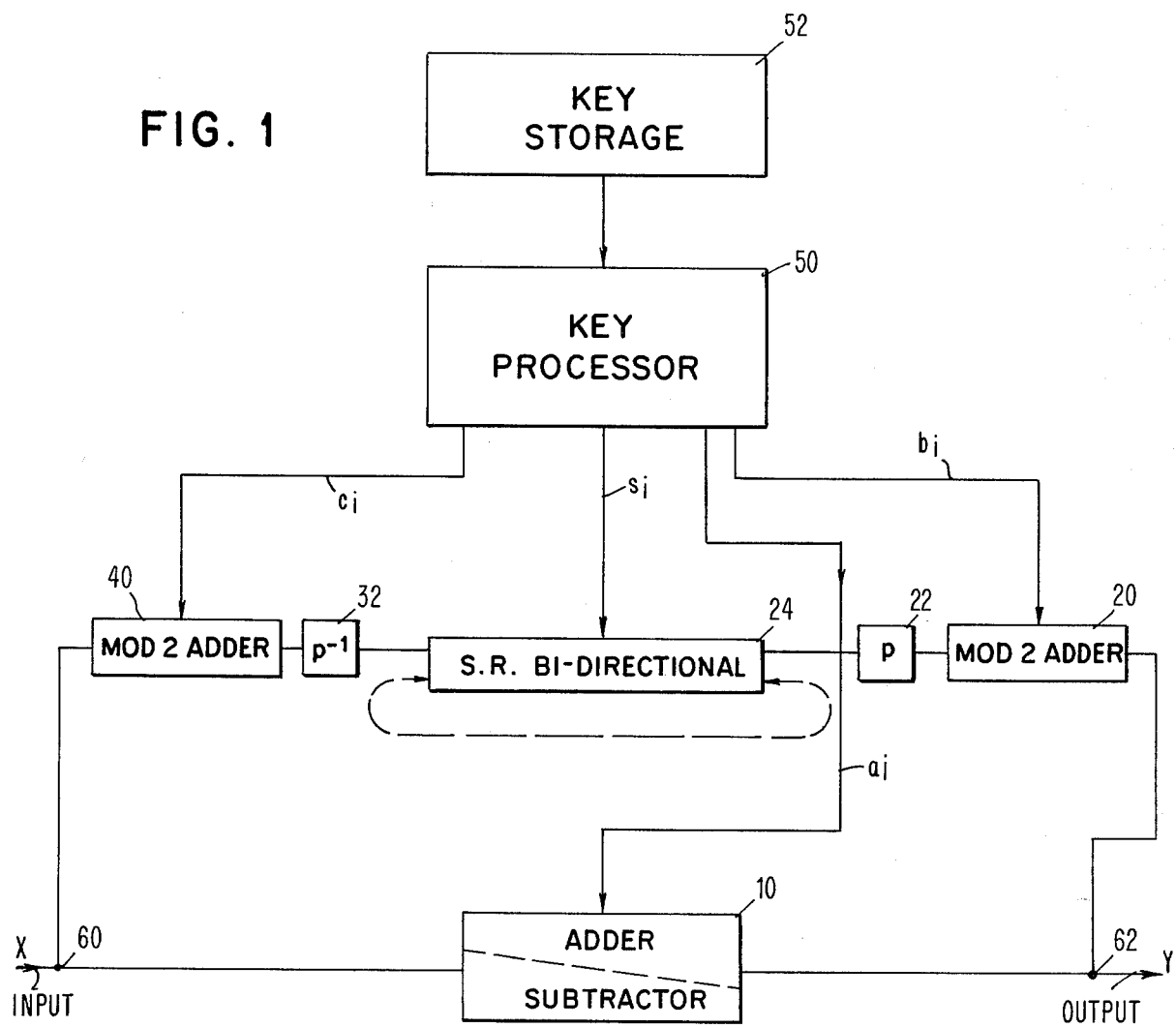
FIG. 1 comprises a broad functional block diagram of the overall cryptographic system of the present invention.

Referring briefly to FIG. 1, the system is shown in functional block diagram form. The key storage 52 is the area where the unique binary keys are stored for the various users of the system. A specified 128 bit binary key is transferred from key storage into the key processor 50 upon initiation of the system. Assuming it is desired to encrypt a block of clear text data, this data (x) is loaded into the input and it is first gated to block 10 where an addition-with-carry takes place with a unique first generated key a. The result of this transformation passes through the first modulo-two adder 20 where it is combined with a second key b. Permutation blocks 22 and 32 are the inverse of each other, i.e., P and $P^{-1}$. This means in essence that the first permutation 22 is undone or transformed back into its original order by the second permutation 32. The bi-directional shift register 24 causes rotation of the bits emanating from block 22 in accordance with a key rotation magnitude signal s. The output from the shift register is then gated through the permutation block 32 into the second modulo-two adder stage 40 where it is combined with the key c. This operation continues until a desired number of rounds of encryption have occurred and finally an intricate block of data is gated out as block y.

Figure 2:
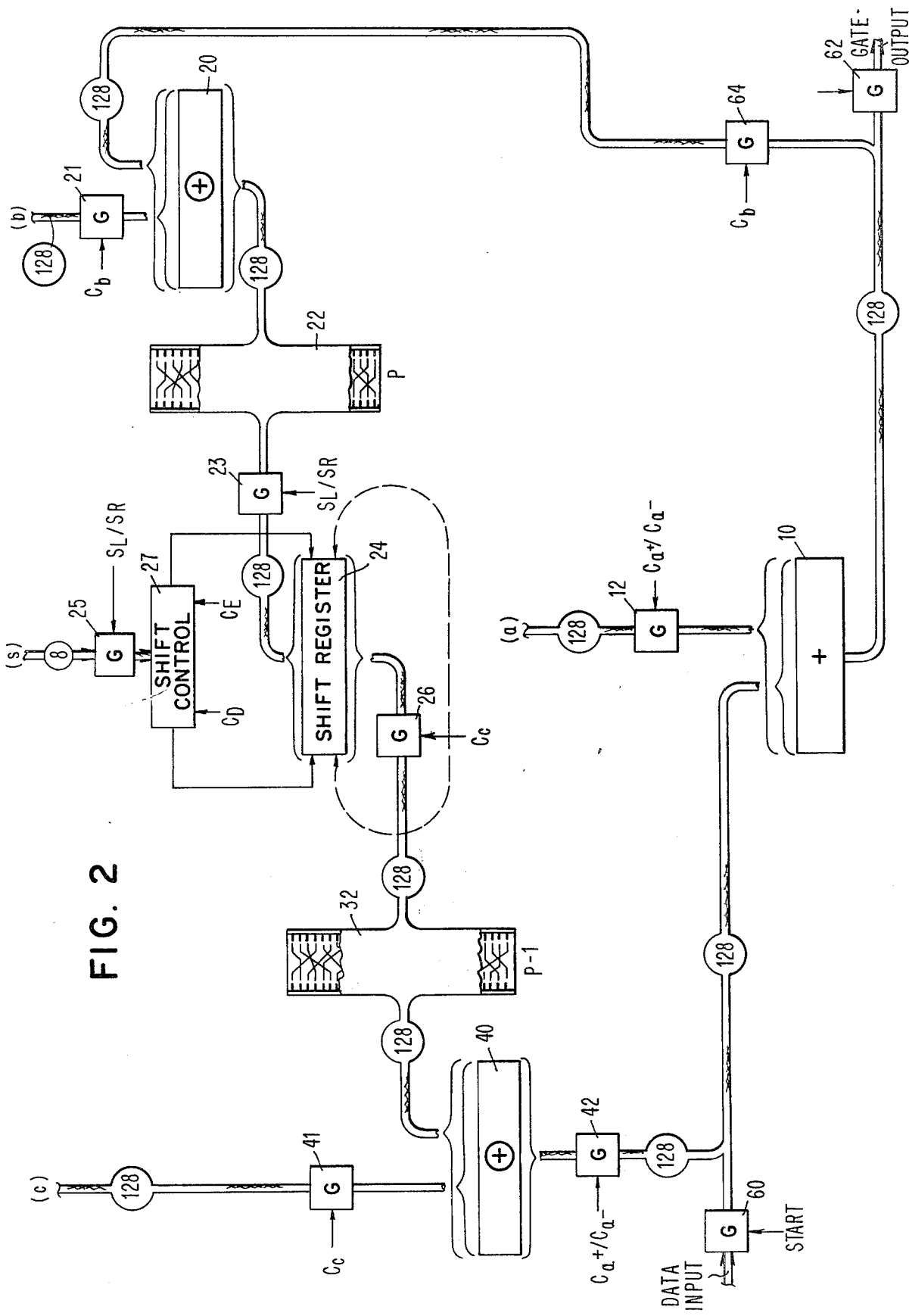
FIG. 2 comprises a combination functional block and logical schematic diagram of that portion of the overall cryptographic system producing the actual transformations on blocks of data.

FIG. 2 shows more of the details of the transformation circuitry of FIG. 1, it being especially noted that the permutation blocks 22 and 32 are shown in sufficient detail that the inverse permutation function is apparent. Similarly, the numbers of bits in the various cables are clearly shown in this figure, it being noted that data blocks of 128 bits and key blocks of 128 bits are utilized.

Figure 3A:
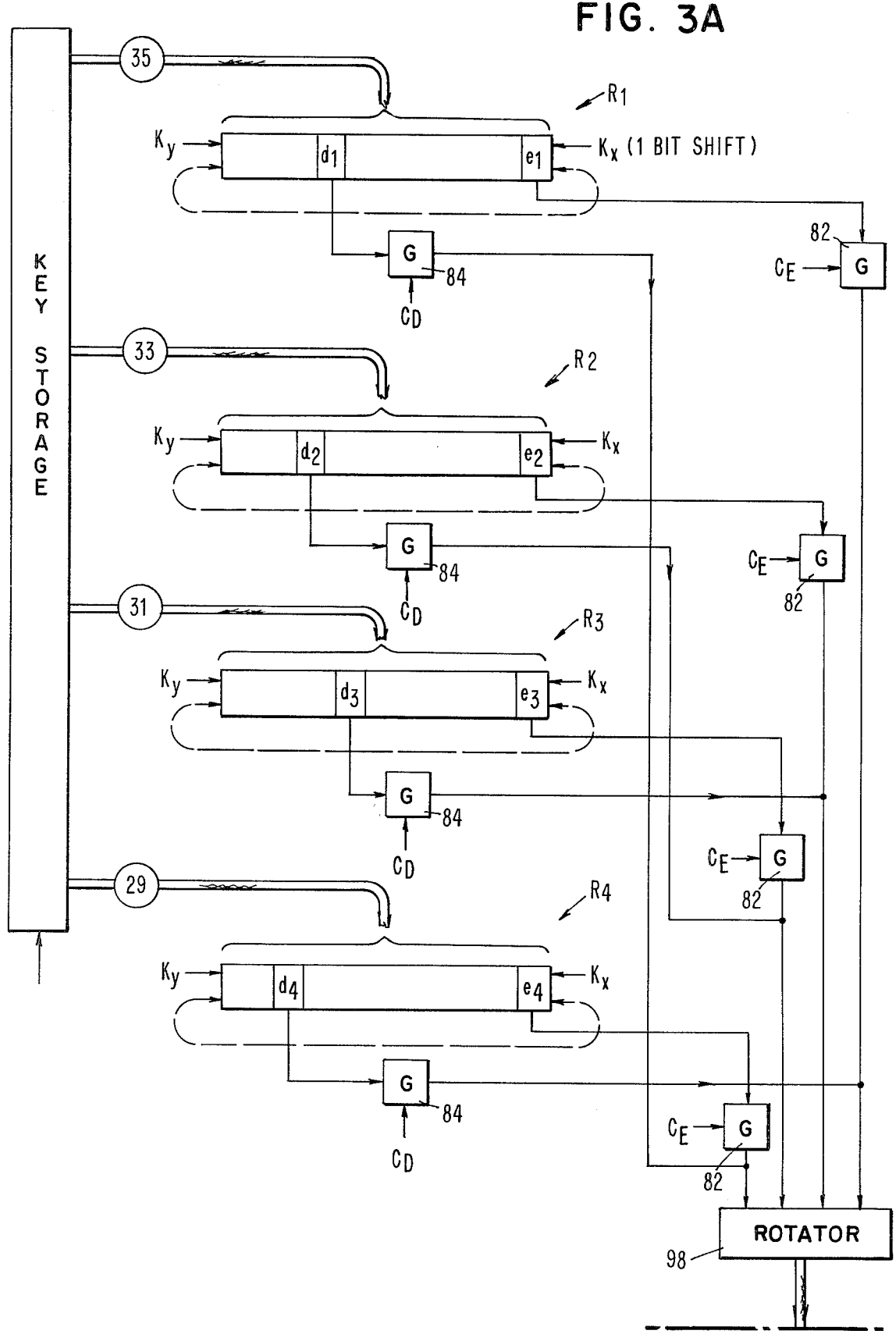
FIGS. 3A and 3B comprise a combination logical schematic and functional block diagram showing many of the operating details of the key generation block of FIG. 1.
Figure 3B:
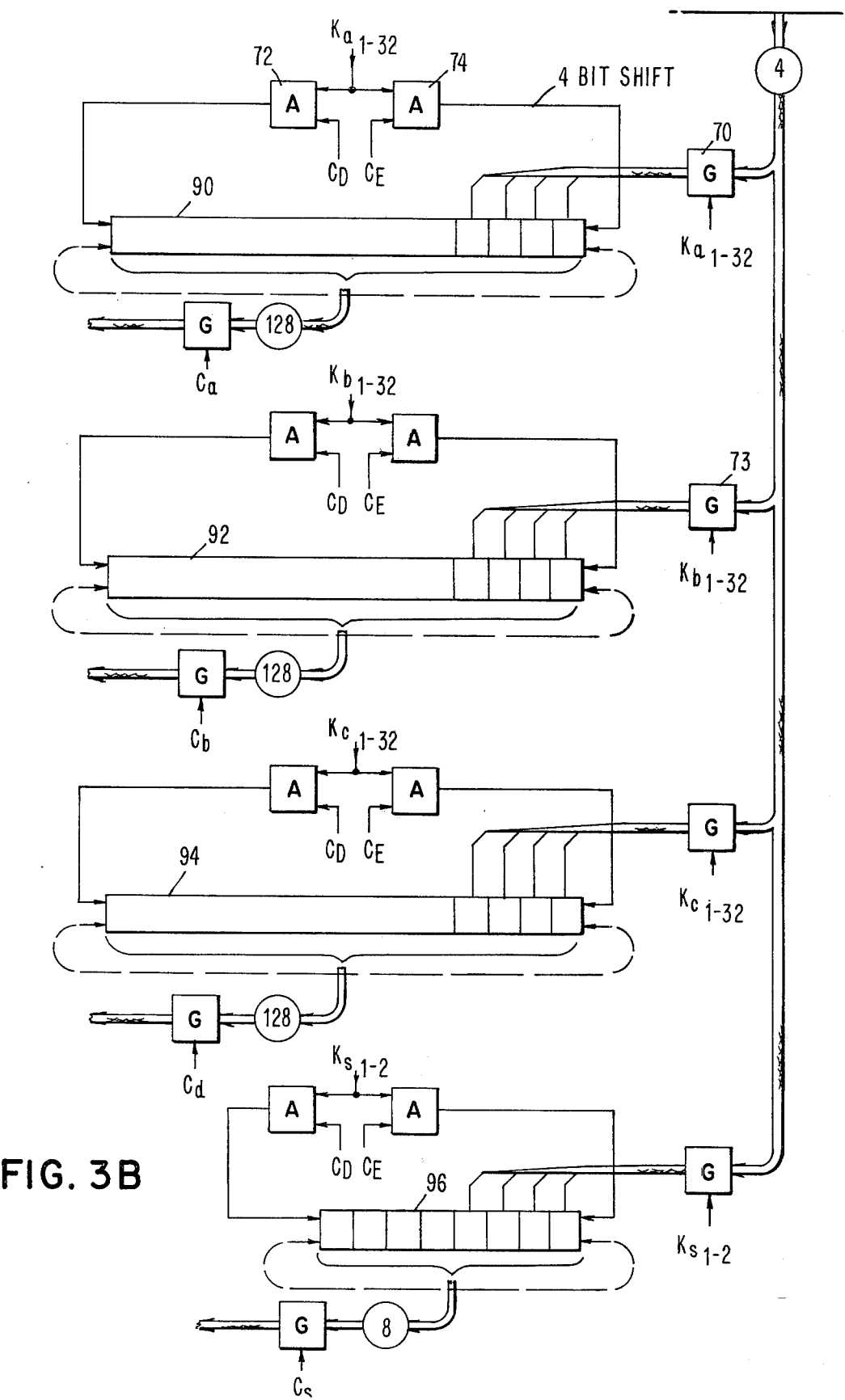

FIGS. 3A and 3B show the details of the key processor 50. It will especially be apparent in FIG. 3A that the four key generation registers $R_1$, $R_2$, $R_3$ and $R_4$ contain 35, 33, 31 and 29 bits respectively whereby the register storage capacities are relatively prime, i.e., have no common denominators other than one. Also, the total number of bits therein adds up to 128. The four registers 90, 92, 94 and 96 shown on FIG. 3B are for the purpose of accumulating successive keys $a_i$, $b_i$, $c_i$ and $s_i$ as they are generated by the above key generation registers. It will further be noted that both of these sets of registers are bi-directional shift registers which is of significance when it is remembered that their direction is reversed when changing from encryption to decryption operations.

Figure 4:
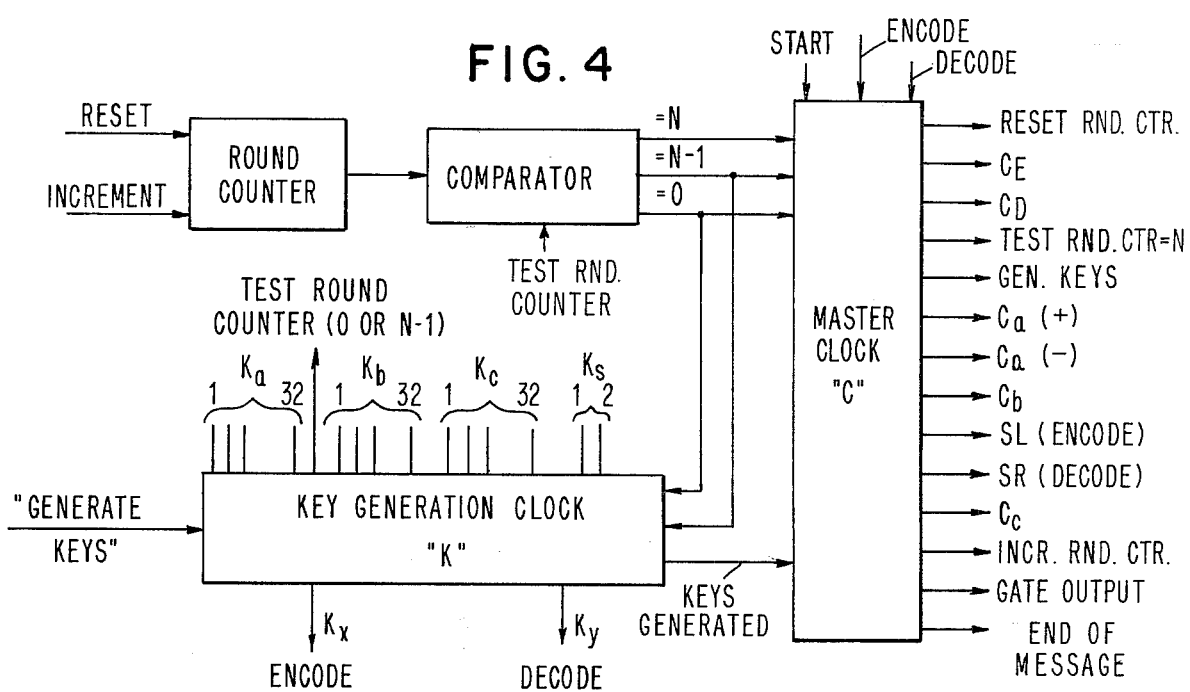
FIG. 4 comprises a functional block diagram of the essential portions of a clock that would control the present cryptographic system.

FIG. 4 is a functional block diagram of a clock suitable for controlling the present system. The clock is composed of three basic units, the master clock C which controls the overall data flow within the system including the counting of rounds to determine in just what phase of operation the system is currently operating. The second is the key generation clock K which controls the operation of the key generation shift registers shown in FIGS. 3A and 3B which sequentially generate the key material for each of the rounds. It will again be noted that for each round, four separate and distinct keys are generated $a_i$, $b_i$, $c_i$ and $s_i$. Additionally, a test of the round counter must be made to determine if the system is doing the initial transformation on encryption or the final transformation of a decryption operation wherein only the key material $a_O$ and $a_n$ are required. The third unit is the round counter and a comparator associated therewith which is utilized in a straightforward manner to monitor the operation of the system and keep track of the rounds.

Figure 5:
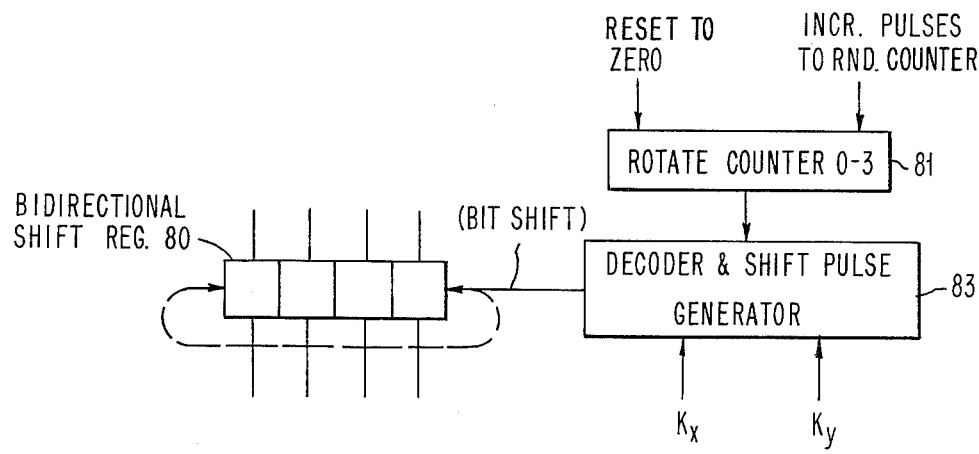
FIG. 5 is a combination logical schematic and a functional block diagram of one embodiment of the rotator block shown in FIG. 3.

FIG. 5 shows details of one possible form of bit rotator 98 shown on FIG. 3A. As will be apparent from the subsequent description, this circuit is for the purpose of, in essence, commutating the bit positions or bits generated by each of the bit generation registers $R_1$ through $R_4$ between rounds. That is to say on the first round the bit produced by bit position $e_1$ appears in the first, fifth, ninth, thirteenth, etc. bit positions of all of the keys $a_i$ through $s_i$. The function of the rotator is to rotate the bit position during successive rounds so that on say the second round, the bit obtained from position $e_1$ of register $R_1$ would appear in the second, sixth, tenth, fourteenth, etc. bit position and on the next round in the third, seventh, eleventh, fifteenth and etc. bit positions. It is of course necessary that this rotational circuit operate in the reverse manner during decryption from that utilized during encryption. Accordingly, the bi-directional shift register 80 may be operated in either direction.

Before proceeding with a more detailed description of the hardware as set forth in the accompanying drawings, the following general description of the present overall cryptographic algorithm is presented. Included is a theoretical description of the basic cryptographic algorithm as well as a description of the operation of the key processor or generator.

In describing the overall cryptographic method certain conventions must first be set up for consistency. The 128-bit blocks are labelled from right to left. The input x to the system has the form $$x = [x^{128}, \ldots, x^2, x^1]$$

This input of binary pulses is gated at 60 into the system. Prior to the first complete round, an addition-with-carry takes place at 10. 128-bits are supplied to 10 from the key processor 50 for $$a_0 = [a_{(0)}{}^{128} \ldots, a_{(0)}{}^2, a_{(0)}{}^1]$$

This block is added-with-carry to $x_0$ to get $$y_O = (a_0 + x_0)$$

A round counter initially set at zero is now advanced to 1, and we are ready to begin round 1.

The sequence of operations occurring at an arbitrary round i will now be described where: $1 \leq i \leq n$ where N is the number of rounds to be carried out.

At beginning of round i, we have $$y_{i-1} = [y_{(i-1)}^{128}, \ldots, y_{(i-1)}^2, y_{(i-1)}^1]$$

from the output of adder 10. 128-bits are gated from key processor 50 to the exclusive-or circuit 20 having the form:

$$b_i = [b_{(i)}^{128} \ldots b_{(i)}^1]$$

and at 20 an exclusive-or operation takes place $$b_i \oplus y_{i-1} = [b_{(i)}^{128} \oplus y_{(i-1)}^{128}, \ldots, b_{(i)}^1 \oplus y_{(i-1)}^1]$$

This block passes through a permutation P, 22, which interchanges the 128 bit positions. P is a wire crossing network which acts as a permutation on the set $\{1, 2, \ldots, 128\}$ of the indices of the 128-bit block supplied thereto. Thus at 22

$$P(b_{(i)} \oplus y_{(i-1)}) = [b_{(i)}^{P(128)} \oplus y_{(i-1)}^{P(128)}, \ldots, b_{(i)}^{P(1)} \oplus y_{(i-1)}^{P(1)}]$$

Note that $2^7 = 128$ so that 7 bits are needed next to determine one of a possible 128 shift-left-circulars of the bits of $P(b_i \oplus y_{i-1})$.

8 bits are supplied by the key processor 50 to 24 the circular shift register control. The high order bit is ignored, and the remaining seven bits determine a binary number which determines the amount to shift the indices.

At the output of shift register 24, this block is of the form:

$$SLC_{(i)} P(b_{(i)} \oplus y_{(i-1)}) = [b_{(i)}^{P(128) - SLC_i} \oplus y_{(i-1)}^{P(128) - SLC_i}, P(128) - SLC_i, \ldots, b_{(i)}^{P(128) - SLC_i + 1} \oplus y_{(i-1)}^{P(128) - SLC_i + 1}]$$

Next at block 32 the bits are now interchanged by the permutation inverse of block 22 yielding an output block of the form:

$$P^{-1}(SLC_{(i)} P(b_{(i)} \oplus y_{(i-1)}))$$

Next the key processor 50 supplies 128 bits to the operation performed in exclusive-or block 40. These bits are defined as:

$$c_i = [c_{(i)}^{128}, \ldots, c_{(i)}^1]$$

The exclusive-or operation at 40 produces a block having the form:

$$c_i \oplus (P^{-1}(SLC_i P(b_i \oplus y_{i-1})))$$

This block is gated as the addend to the carry adder 10 where an addition-with-carry takes place with an augend defined as:

$$a_i = [a_{(i)}^{128}, \ldots, a_{(i)}^1]$$

Once again the bits for the augend $a_i$ to be added to the message block is supplied to carry adder 10 by the key processor 50 prior to the arrival here of the intermediate cipher block. The output of 10 is a block having the form:

$$y_i = a_i + (c_i \oplus (P^{-1}(SLC_i P(b_i \oplus y_{i-1})))).$$

The round counter is now stepped up to $i+1$. If $i < N$ then $y_i$ is gated at 64 back thru the algorithm for another round. If $i = n$, $y_i$ is gated at 62 to the output of the cryptographic system.

Thus $y = y_n$.

The round counter is set back to zero, ready for the arrival of the next message block x.

For decipherment, the operation of the algorithm is identical to the above with two exceptions. In carry adder 10, addition-with-carry is replaced by subtraction-with-borrow and in shift register 24 shift-left-circular is replaced by shift-right-circular. Additionally, the key must be generated in reverse beginning with the last key generated by the encryption operation. This is explained in detail subsequently, however in general this is done by selecting specific bit locations of the key generator shift registers $R_1$, $R_2$, $R_3$ and $R_4$ and running the registers in 90 and also the key accumulator registers 90, 92, 94 and 96 in reverse. Additionally, the rotator 98 must be operated in reverse.

The logical expression which characterizes or defines the ith decryption round appears as follows:

$$y_i = -a_i + (c_i \oplus (P^{-1}(SRC_i P(b_i \oplus y_{i-1})))).$$

The overall decryption step requires N such rounds plus an additional subtraction-with-borrow at the end which is the inverse of the addition-with-carry which preceded the N rounds of encryption.

The key processor operates as follows. 128 bits of key are loaded into the key reader. This information could be on cards so that K would have to have a card reading facility. Or it could be 128 two-position switches. (Slight care must be exercised to avoid loading in either almost all zeros or almost all ones.) 128 bits are now loaded in four registers $R_1$, $R_2$, $R_3$, $R_4$, all having approximately the same size on one hand yet having relatively prime sizes on the other. 35, 33, 31, 29 are sizes that will do nicely. If a key size other than 128 would be used, then four other such numbers would have to be chosen.

During encipherment, the key processor operates as follows. A bit is taken from the first position in each register $R_1$, $R_2$, $R_3$, $R_4$, and loaded in order into the rotator 98. The rotator is shifted circularly to the left, the roles played by $R_1$, $R_2$, $R_3$, $R_4$ by an amount determined by the round counter. If the round counter is at i, then the rotator 98 is shifted by the remainder of i divided by 4. Now the bits from A are taken out in order and dispatched by D to the operations in the algorithm. If we were at round 0, these four bits would fill up the first four bit positions of $a_0$. To get the next four bits, each register $R_1$, $R_2$, $R_3$, $R_4$ is shifted once to the left. Now the bits of position 35 of $R_1$, 33 of $R_2$, 31 of $R_3$ and 29 of $R_4$ occupy the output position of each of the registers. These are now sent to the rotator 98 A which keeps the roles played by $R_1$, $R_2$, $R_3$, $R_4$ fixed during each round of the algorithm but which advances the roles by one on each successive round. Next the four bits are sent by D to fill up the next four bits in whatever operation of the algorithm is currently being supplied bits.

This proceeds until all operations of all the rounds of the algorithm have been completed.

Prior to round 1, 128 bits are needed for $a_0$. Then on round one 128 bits for $\oplus\ b_1$
    8 bits for $SLC_1$
    128 bits for $\oplus\ c_1$
    128 bits for $+a_1$
    392 bits in total are needed from the key processor for round one and for each succeeding round. If N is the number of rounds, then $128+392\cdot N$ bits are needed.

Resetting after the algorithm is completed (this is determined by the round counter which reads the number N) registers $R_1, R_2, R_3, R_4$ are reset to their original positions. A resetting device must reset the rotational circuit 98 also.

In decipherment mode, the key processor must supply the same bits in the reverse order to that presented during the encipherment mode. To do this, the registers $R_1, \ldots, R_4$ are shifted once to the right each time (previously to the left). Similarly, the rotational circuit 98 circularly shifts the bits from registers $R_1, \ldots R_4$ once to the right after each round.

The resetting device plays a special role in decipherment. Upon switching to decipherment mode $R_1, R_2, R_3, R_4$ and 98 must be set to the last position that was needed during encipherment upon completion of each round of decipherment.

Having generally described the overall theory of operation of the present cryptographic system together with the operation of the concept of key generation, reference is again made to FIGS. 2-5 for a more detailed description of the operation of the disclosed hardware.

Referring specifically to FIG. 2 and assuming that an encryption operation is to be performed a first data block is gated through the gate circuit 60 by the start pulse or a delayed derivative thereof which gates a 128 bit clear message block into the carry adder 10. At this point the start and encode lines into the master clock shown on FIG. 4 are enabled which causes the round counter to be reset to zero and the lines $C_E$ to become active to set the gate circuits in the key generation clock shown on FIGS. 3A and 3B. Next the round counter is tested and since it has been reset to 0 the clock knows the algorithm is not through and sends a "generate keys" signal to the key generation clock. This causes the key generation pulses $K_{a1-32}$ to become active to generate the first key $a_0$. At this point the round counter is tested by the key generation clock and since it is found to be at 0, the key generation clock automatically branches to its end function and sends back a "keys generated" signal to the master clock. This causes the output labeled $C_{a+}$ to become active which energizes gate circuit 12 to gate the key material $a_0$ to the adder with carry 10 where an addition is performed. It will be noted that an inhibit circuit within the master clock prevents the gate circuit 42 from being activated by the $C_{a+}$ line during this initial addition operation. Similarly on this first round the master clock branches forward to the "increment round counter" step and then to the "test round counter step" where it now finds the round counter at 1. The "generate keys" line comes up causing the key generation clock K to generate all four keys a, b, c, and s. Upon the receipt of the "keys generated" signal from the key generation clock, a full encryption round takes place beginning with the production of the pulse $C_b$ which gates the cipher block through gate circuit 64 and the key b through gate circuit 21 into exclusive OR 20. Subsequent to this the SL pulse comes up which gates the current cipher block through gate circuit 23 into the shift register 24. Through an appropriate delay the SL pulse is applied to gate circuit 25 to gate the shift key s into the shift control 27. This control circuit decodes the seven significant bits in the shift key $s_1$ and depending upon whether the line $C_E$(encode) or $C_D$(decode) is up will cause the shift register to shift to the left an amount equal to the shift key value s.

Next the line $C_c$ comes up causing the cipher block to be gated from 24 in its newly shifted configuration through the inverse permutation block 32 into the second exclusive OR circuit 40. Concurrently $C_c$ is applied to gate circuit 41 to also gate the key c into the exclusive OR. Next the round counter is incremented and tested to see whether another round of encryption is required. If so the "generate keys" line is again brought up or if not the "gate output" line enables gate circuit 62 to gate the cipher block out of the system.

Referring now to FIGS. 3A and 3B which essentially comprise the key processor 50 of FIG. 1 the details of the operation of this preferred embodiment are set forth. As will be remembered this circuitry operates primarily under control of the key generation clock K shown in FIG. 4. An exception to this, as will be noted, are the pulses $C_D$ and $C_E$ which come from the master clock C and merely set up the data flow paths depending on whether an encryption or decryption operation is occurring. As will be readily apparent the presently disclosed embodiment represents but one way in which the key material can be generated utilizing the basic concept of a plurality of key generation registers having numbers of storage positions which are relatively prime to each other. In this embodiment each key is generated byte serially. That is, four bits constituting a byte are generated in each cycle and 32 such cycles are necessary to generate a full 128-bit key. For the shift key s only two such cycles are necessary as only 8 bits are required. It would almost be possible to gate more than 1 bit at a time from each register and provide the appropriate lines into the storage registers 90, 92, 94 and 96. Thus if the end 8 bits rather than 1 bit were to be gated out, register $R_1$ would provide bits in the storage register 90 at bit locations 1, 5, 9, 13, 17, etc. Register $R_2$ would provide bits 2, 6, 10, 14, 18, etc. so on for a total of 32 bits. It would then of course be necessary to shift the registers $R_1$–$R_4$ by 8 bits during each cycle rather than 1, however, only four such 8 bit shifts would be necessary to generate a full 128 bits of key.

Referring now to the specifically disclosed embodiment. In each key generation cycle a bit $K_x$ causes all four registers to shift 1 position (the direction of shift depending upon whether encoding or decoding is involved). In FIG. 3A the shift pulses are designated as $K_x$ and $K_y$. These pulses may be simply derived by an ORing operation from all of the key generation lines coming out of the key generation clock with the exception of the 'test round counter' line. This is because each of these cyclic shifting operations is the same regardless of which of the keys a, b, c or s is being generated. However, gate circuit 70 which gates data into the shift register 90 restoring the key a must be enabled only during the generation of the key a. Thus gate circuit 90 is enabled by each of the 32 pulses $K_{a1-32}$ which pulse stream is delayed slightly from the pulses $K_x$ and $K_y$ utilized to increment the shift registers. This is, as will be apparent, to allow the shift register to settle down for getting the information out of same. The 4 bits are gated into the rightmost bit locations in the shift register 90 as will be understood. Next, in order to make way for the next operation shift register 90 must be shifted 4 bits. Again the direction depends upon whether encryption or decryption is being performed. The directionality may be determined by the very simple logic circuit shown including the two AND gates 72 and 74. One of whose inputs is enabled by the pulses $C_D$ or $C_E$ and the other input is enabled by the pulse train $K_{a1-32}$ which is delayed a second time period from the pulse applied to the gate circuit 70. This delay again is to allow the bit storage locations of the shift register to settle down after the four bits are gated into same before the shifting operation occurs. Here it will be apparent that a 4-bit shift signal must be applied to the shift register in order to appropriately shift the information 4 bits to allow 4 new bits to be entered. This may be accomplished automatically by wiring in the shift register or by an appropriate shift pulse generator, not shown, which could easily provide the requisite four shift pulses.

On the completion of the generation of the key material a the round counter is tested to determine whether the remainder of the keys must be generated. Assuming that they are to be generated gate circuit 72 is successively energized by the pulse train $K_{b1-32}$ to again repeat the operation for the generation of the key material b. This operation occurs exactly as for key material a. Keys c and s are generated in the same manner, it being noted that only 8 bits are required for s and accordingly the shift register 96 is only 8 bits long.

During the decoding operation the keys are generated exactly the same way as they are for encoding. The exception is that the circular storage registers 90, 92, 94 and 96 are operated in the reverse direction. Thus during the encoding operation, assuming that the bits move to the left, at the end of the operation, i.e., 32 iteration the first 4 bits generated would occupy positions 128, 127, 126 and 125. During a decoding operation these same 4 bits would occupy the 4 low-order bit positions, i.e., 1, 2, 3 and 4, after the final key generation iteration. It is again noted that the basic registers $R_1$ through $R_4$ have their key bits taken off in different places as indicated in the drawing and as set forth in the general description of the operation of the key processor. It will of course be readily understood that a preshifting operation could be effected in these registers prior to decoding so that the bits stored in positions $d_1$ through $d_4$ appear in positions $e_1$ through $e_4$. The requisite shifting signals to be applied to the shift registers could be easily computed. In this latter case it would not be necessary to provide the gates 82 and 84 since this selection feature would automatically taken care of by the above rotation of the registers.

Referring briefly to FIG. 4, as stated previously, the clocks are constructed of conventional hardware and could comprise either a series of single shots having both TURN ON and TURN OFF pulses as well as appropriate branching circuits actuated by the necessary logic information where branches are necessary. The key generation clock could either be a series of such single shots or could also be comprised of a pulse generator having a suitable period and an appropriate control counter for producing the requisite pulse trains for generating the key sequences $K_a$ through $K_s$. The round counter is a simple counter circuit capable of counting up to the desired number of rounds N. The comparator as disclosed would essentially comprise three comparison circuits for detecting the three conditions N, N−1, and 0.

FIG. 5, as stated previously, comprises the rotator 98 shown in FIG. 3A. In operation each time 4 bits are loaded into the bi-directional shift register 80, depending upon the setting of the rotate counter 81, the contents of the register 80 will be shifted up to 3 positions depending upon the setting of said counter. As will be apparent this shift must occur each time 4 new bits of key are generated however the amount of shift remains the same for the entire round. Accordingly the key material is brought directly from the register positions $e_1$ through $e_4$ and the bits are shifted while stored in register 80 under control of the decoder and shift pulse generator 83. The timing for this operation may be provided by the clock pulses $K_x$ and $K_y$, depending upon whether encryption or decryption is being performed, wherein the particular $K_x$ and $K_y$ pulse will be delayed a short interval to allow the key generation registers $R_1$ through $R_4$ to reach a steady state. It is of course apparent that other techniques could be equally well utilized to achieve the rotational effect such as cross-point switches or the like.

The following table is presented for the purpose of recapitulating both the encode and decode operations of the present method and apparatus. The two columns shown in the table specify the essential operations which must be performed during each of the enumerated operations. All of the requisite steps are shown for each operation. It will be especially noted that the bracketed portions indicate those steps which constitute an encryption or decryption round. It will further be noted that exactly the same number of steps are involved in each case but that the order of steps varies slightly, plus it may be seen that for encryption the initial addition with carry is performed prior to entering the standard encryption round. Conversely during decryption the initial addition (−) with carry becomes part of the first round. This is for convenience only and could be reversed. However, it should be understood that if one of the operations is reversed the other one must also be reversed so that the encryption and decryption remain the mathematical inverse of each other which is absolutely necessary to successful decryption of an encoded message.

TABLE

| Encode | | Decode |
|---|---|---|
| - Reset round counter | | - Reset round counter |
| - Enter block of clear data | | - Enter block of cipher data |
| - Generate $a_0$ | | - Generate $a_0$ $b_0$ $c_0$ $s_0$ |
| - Do $+a_0$ | | - Do $-a_0$ |
| - Increment round counter | decrypt | - Do $\oplus$ $b_0$ |
| - Test round counter | round | - Do shift right with $s_0$ |
| - Generate $a_1$ $b_1$ $c_1$ $s_1$ | | - Do $\oplus$ $c_0$ |
| - Do $\oplus$ $b_1$ | | - Increment round counter |
| - Do shift left with $S_1$ | encrypt | - Test round counter |
| - Do $\oplus$ $c_1$ | round | - Generate $a_1$ $b_1$ $c_1$ $s_1$ |
| - Do $+a_1$ | | — |
| - Increment round counter | | — |

TABLE-continued

| Encode | Decode |
|---|---|
| - Test round counter | — |
| - Generate $a_2$ $b_2$ $c_2$ $s_2$ | — |
| — | — |
| — | — |
| — | - (Do decrypt rounds until round counter |
| - (Do encrupt rounds until round counter | = N − 1) |
| - Gate cipher block to output | - Generate $a_n$ |
| | - Do $-a_n$ |
| | Gate block of clear data to output |

EXAMPLE

The following comprises an 8-bit example of the operation of an encryption routine. For consistency of reference, consider an 8-bit block to be labelled from right to left thus:

$$x = [x_8, x_7, x_6, x_5, x_4, x_3, x_2, x_1]$$

To follow a specific example through one round of the algorithm, let an 8-bit input block be represented as $x$ where $x = [0\ 1\ 0\ 0\ 1\ 0\ 1\ 1]$ $x$ is gated to the carry adder 10 where prior to the first complete round an initial addition-with-carry takes place: $x + a_0$. Next assume the initial key generation produces:

$$a_0 = [0\ 0\ 1\ 0\ 1\ 1\ 0\ 1]$$

these bits are supplied to the registers of 10 from the key generator 50.

The output of adder 10 has the values:

$$y_0 = (x + a_0) = [0\ 1\ 1\ 1\ 1\ 0\ 0\ 0]$$

The first complete round of encryption now takes place. The result $(x + a_0)$ is gated to 20 where bits are supplied to 20 from the key generator 50 for $b_1$. Let $$b_1 = [1\ 1\ 1\ 1\ 0\ 0\ 1\ 0]$$

At 20 an "exclusive-or" operation is performed rendering:

$$b_1 \oplus (x + a_0) = [1\ 0\ 0\ 0\ 1\ 0\ 1\ 0]$$

At 22 a fixed permutation (P) of the bits is done. Say, for a very simple case, the first bit is interchanged with the last bit. That is $$P(b_1 \oplus (x + a_0)) = [0\ 0\ 0\ 0\ 1\ 0\ 1\ 1]$$

At 24 a shift left circular is performed by an amount determined from 3 key bits (s) coming from 50. There are 8 possible shifts in this example. The three bits of (s) will determine this. Let us say four bits [0 1 0 1] have come from the key processor. The high order bit will be ignored. So in binary form 1 0 1 is the number 5 which indicates a shift of 5 to the left. Thus at shift register 24 we perform $$SLC_1(P(b_1 \oplus (x + a_0))) = [0\ 1\ 1\ 0\ 0\ 0\ 0\ 1]$$

At permutation block 32 the inverse permutation of 22 is performed which in this particular example happens to be the same, i.e., interchanging high and low order bits. So $$P^{-1}(SLC_1(P(b_1 \oplus (x + a_0)))) = [1\ 1\ 1\ 0\ 0\ 0\ 0\ 0]$$

At exclusive-or 40, the key generator 50 supplies 8 bits of key $c_1$, say, $$c_1 = [0\ 1\ 0\ 1\ 0\ 1\ 0\ 1]$$

and another "exclusive-or" operation is performed to render:

$$c_1 \oplus P^{-1}(SLC_1(P(b_1 \oplus (x + a_0)))) = [1\ 0\ 1\ 1\ 0\ 1\ 0\ 1]$$

At carry adder 10 the key generator 50 supplies 8 bits of $a_1$, say, $$a_1 = [1\ 0\ 0\ 0\ 0\ 0\ 0\ 1]$$

and an addition-with-carry is performed finishing the first round:

$$y_1 = a_1 + (c_1 \oplus P^{-1}(SLC_1(P(b_1 \oplus (x + a_0))))) = [0\ 0\ 1\ 1\ 0\ 1\ 1\ 0]$$

Since for the present example only one round is described, the round counter would indicate that the algorithm is over and the result $$y = y_1$$

would be gated to the output.

CONCLUSIONS

The strength of the present system is derived from the alternation of affine transformations with nonlinear ones. The addition-with-carry is nonlinear while the operation of the other five is affine. In fact there is a mathematical proof that the operators SLC and + generate the full symmetric group on $2^{128}$ elements, i.e., all possible decipherable encipherments of the $2^{128}$ different message blocks. This means the system is potentially as strong as is theoretically possible. And since the context of the full symmetric group is assumed, it may be said that this system cannot be subjected to any easy mathematical or statistical analysis. However, to achieve the theoretical limits one would have to supply many many more key bits than is done by means of the key generator and let the algorithm iterate many more rounds than would be practicably possible. Nevertheless great cryptograhic strength can be obtained with the algorithm operating in its present form with a reasonable number of rounds. The number of rounds N is a design parameter and must be chosen large enough to provide cryptographic strength. If $N \leq 8$, the system might be subject to mathematical analysis and thus be weak. The criterion for choosing a value for N is that it should be set well above the threshold where every output bit is a function of every input bit. If $N \geq 128$ the system would probably be strong to the point of excess. For $N \geq 32$ the system is probably very strong and not subject to any well known mathematical analysis, if indeed any mathematical analysis known at all.

The permutation P can also be designed to be set at the will of the users. Thus it can be considered as part of the key in addition to the 128 bits for K. Having once been set, P stays fixed throughout the N rounds of the algorithm. Compared to the regular periodic changes in the key K those for P would probably be performed much less frequently due to the fact that it is not as easy to do. Nevertheless, the use of P is deemed an added improvement. It is an operation not normally found in hardware in the computer. It can be programmed in software but it is rather cumbersome to do so. It and its inverse $P^{-1}$ can be easily left out of the present scheme if including them would mean inordinate hardware costs or inconvenient software programming. Leaving P and $P^{-1}$ out does not materially impair the basic security of the system.

The 128 bit key K is quite large enough to frustrate any attack on the system by trial and error methods. On the other hand it is small enough so that users can conveniently set it.

There are $2^{128}$ possible key settings. Most of them are good. However, a small fraction of the key settings are weak, the weakest one being K equal to 128 zeros. In this case the algorithm is the identity transformation which leaves every x unchanged. With a little care this trouble can be easily avoided. All that is required is that the bits of K be chosen somewhat randomly so that there are abundant quantities of both zeros and ones.

If protection against cataloguing is desired a binary clock can be used to generate a sequence of different blocks to be added to any specified block of key bits before the algorithm is applied to the next message in which case no two encipherments of the same message will be necessarily identical until the clock repeats itself. The method of addition of clock bits to key bits could be with or without carry. An alternative method would be to reserve part of the message space for these clock blocks.

While the present invention has been particularly shown and described with reference to a preferred embodiment thereof, it will be understood by those skilled in the art that the foregoing and other changes in form and details may be made therein without departing from the spirit and scope of the invention.

What is claimed is:

1. A cryptographic method for encrypting and decrypting an n-bit block of binary data utilizing an initially provided unique binary key, the encryption operation comprising the performance of a plurality (N) of encryption rounds, each round including the transformational operations of addition-with-carry, a first modulo-2 addition, rotational shifting, and a second modulo-2 addition; and wherein each included operation is performed using the n-bit result block of the previous transformational operation together with an n-bit key block derived from said initially provided key material, and wherein said decryption operation is identical to the encryption operation except that the direction of the rotational shifting is reversed and the addition-with-carry becomes subtraction-with-borrow.

2. A cryptographic method as set forth in claim 1, wherein said method includes in addition to said N-rounds a further addition-with-carry for an encryption operation and a further subtraction-with-borrow for a decryption operation.

3. The method as set forth in claim 2, including performing a first fixed permutation (P) of the bits of the data block before performing said rotational shifting operation and performing the inverse ($P^{-1}$) of the first permutation (P) on the n-bits of the data block subsequent to said rotational shifting operation.

4. A cryptographic method as set forth in claim 2, including the steps of generating a different n-bit key block for each transformation operation occurring in said system including selecting said keys so that each key block generated during a given cryptographic operation will be uniquely dependent upon the unique binary key initially provided to the system.

5. A cryptographic method as set forth in claim 4, including the steps of generating said key material by successively accessing predetermined bit positions in a plurality of rotational shift registers having a plurality of bit storage locations, each shift register capacity being relatively prime with respect to every other shift register, until a predetermined number of key bits have been accessed and assembled.

6. A cryptographic method as set forth in claim 1, including the steps of presenting the generated key blocks for the various transformation operations in a first order during an encipherment operation and presenting said key blocks to the various transformation operations in reverse order during a decipherment operation.

7. A cryptographic system for performing cryptographic operations upon a block of binary data under control of a unique binary key supplied to the system, said system comprising means for gating a block of binary data to said cryptographic system, key generation means for storing and operating upon said unique binary key to produce a series of key blocks to be used in said cryptographic operations, initial transformation means for selectively performing an addition-with-carry or a subtraction-with-borrow operation, means for performing a first exclusive-or transformation, rotational shift register transformation means operable under control of a key block produced by said key generator means, means for selectively shifting said rotational shift register in either direction, means for performing a second exclusive-or transformation on a block of binary data received from said shift register means, and means for providing a different generated key block to each of said transformation means whereby the transformation operation upon the block binary data entering same is function of said binary key.

8. A cryptographic system as set forth in claim 7, wherein said transformation means operate sequentially on said blocks of binary data presented to the system, said system including a first permutation means for rearranging the bit positions of data entering and leaving said permutation means, said permutation means being located between said first exclusive-or means and said rotational shift register means, and a second permutation means connected between the output of said rotational shift register means and said second exclusive-or means for performing the inverse of the bit transposition performed by said first permutation means.

9. A cryptographic system as set forth in claim 8, including means for generating said successive keys to be utilized during the encryption of a clear data block in a first order of presentation and means for presenting said key material in reverse order during a decipherment operation.

10. A cryptographic system as set forth in claim 9, wherein said means for generating said key material from said originally presented key includes a plurality of bi-directional rotational shift registers, including means for rotating said shift registers in a first direction during an encryption operation and in the reverse direction during a decryption operation.

11. A cryptographic system as set forth in claim 10, wherein each of said rotational shift registers utilized for generating said keys each has a number of storage positions which numbers are relatively prime to each other and wherein the total storage capacity of all of said registers equal the total number of bits of key material originally supplied to the cryptographic system, means for extracting at least one bit from a predetermined storage location in each of said registers to generate a key block, means for shifting said registers between accessing operations and means for repetitively accessing said storage locations until a sufficient number of bits has been obtained to form a block of key material.

12. A cryptographic system as set forth in claim 11, including a rotational commutator means connected to the output of said key generation registers whereby the relative position of the bits from each register may be selectively shifted between successive key generation operations.

13. A cryptographic system as set forth in claim 11, including at least one bidirectionally rotatable shift register for accumulating bytes of key material as it is produced by said key generation means, and means for rotating said accumulating shift register in a first direction during an encryption operation and in the opposite direction during a decryption operation.

14. A cryptographic system as set forth in claim 13, including control means for performing a plurality of cryptographic rounds each including the transformation of addition-with-carry or subtraction-with-borrow, first exclusive-or, a first permutation, rotational shifting, a second permutation the inverse of the first, and a second exclusive-or, and counter means for counting the number of cryptographic rounds performed, and means for testing the current value of said counter to determine if a given cryptographic operation is complete, or requires an addition-with-carry or subtraction-with-borrow operation when in the encryption or decryption modes respectively.

15. A cryptographic system for performing cryptographic operations upon a block of binary data under control of a unique binary key supplied to the system, said system comprising means for gating a block of binary data to said cryptographic system, key generation means for storing and operating upon said unique binary key to produce a series of key blocks to be used in said cryptographic operations, initial transformation means for selectively performing an addition-with-carry or a subtraction-with-borrow operation, means for performing a first exclusive-or transformation, a first permutation means for rearranging the bit positions of data entering and leaving said permutation means, rotational shift register transformation means operable under control of a key block produced by said key generator means, means for selectively shifting said rotational shift register in either direction, and a second permutation means connected to the output of said rotational shift register means for performing the inverse of the bit transposition performed by said first permutation means, means for performing a second exclusive-or transformation on a block of binary data received from said shift register means, and means for providing a different generated key block to each of said transformation means whereby the transformation operation upon the block binary data entering same is a function of said binary key, wherein said means for generating said key blocks from said originally presented key material includes a plurality of bidirectional rotational shift registers, including means for rotating said shift registers in a first direction during an encryption operation and in the reverse direction during a decryption operation.

16. A cryptographic system as set forth in claim 15, including control means for performing a plurality of cryptographic rounds when in the encryption mode, each round including the transformations of addition-with-carry, a first exclusive-or, a first permutation, rotational shifting, a second permutation the inverse of the first, a second exclusive-or, and a further addition-with-carry and when in the decryption mode, each round including the transformations of subtraction-with-borrow, a first exclusive-or, a first permutation, rotational shifting, a second permutation the inverse of the first, a second exclusive-or, and a further subtraction-with-borrow, and counter means for counting the number of cryptographic rounds performed, means for testing the current value of said counter to determine if a given cryptographic operation is complete, a further cryptographic round is required, or a separate addition-with-carry operation or subtraction-with-borrow operation is required.

* * * * *